United States Patent
Muller et al.

(10) Patent No.: US 9,093,208 B2
(45) Date of Patent: Jul. 28, 2015

(54) MAGNETIC FIELD GENERATOR FOR MAGNETOCALORIC THERMAL APPLIANCE

(71) Applicant: COOLTECH APPLICATIONS, S.A.S., Holtzheim (FR)

(72) Inventors: Christian Muller, Strasbourg (FR); Magali Chaussin, Furdenheim (FR)

(73) Assignee: Cooltech Applications, S.A.S., Holtzheim (FR)

( * ) Notice: Subject to any disclaimer, the term of this patent is extended or adjusted under 35 U.S.C. 154(b) by 0 days.

(21) Appl. No.: 14/373,919

(22) PCT Filed: Feb. 21, 2013

(86) PCT No.: PCT/FR2013/000046
§ 371 (c)(1),
(2) Date: Jul. 23, 2014

(87) PCT Pub. No.: WO2013/128085
PCT Pub. Date: Sep. 6, 2013

(65) Prior Publication Data
US 2015/0061802 A1  Mar. 5, 2015

(30) Foreign Application Priority Data
Feb. 28, 2012  (FR) .................. 12 51803

(51) Int. Cl.
*H01F 7/02* (2006.01)

(52) U.S. Cl.
CPC .......... *H01F 7/0278* (2013.01); *H01F 7/0273* (2013.01)

(58) Field of Classification Search
CPC ................................. H01F 7/0278
USPC ........................................... 335/306
See application file for complete search history.

(56) References Cited

U.S. PATENT DOCUMENTS

| | | | | |
|---|---|---|---|---|
| 5,010,640 A * | 4/1991 | Gottschalk | ............... | 29/602.1 |
| 5,291,171 A * | 3/1994 | Kobayashi et al. | ........... | 335/306 |
| 6,946,941 B2 * | 9/2005 | Chell | ............... | 335/306 |
| 7,038,565 B1 * | 5/2006 | Chell | ............... | 335/229 |
| 7,148,777 B2 * | 12/2006 | Chell et al. | ............... | 335/306 |

(Continued)

FOREIGN PATENT DOCUMENTS

WO  2005/074608 A2  8/2005

OTHER PUBLICATIONS

International Search Report Corresponding to PCT/FR2013/000046 mailed Sep. 13, 2013, 5 pages.

(Continued)

*Primary Examiner* — Alexander Talpalatski
(74) *Attorney, Agent, or Firm* — Davis & Bujold, P.L.L.C.; Michael J. Bujold

(57) ABSTRACT

A magnetic field generator (1) comprising first (2) and second (3) identical magnetizing structures mounted opposite and parallel to one another, head-to-tail, and defining at least two air gaps (42, 43). Each magnetizing structure (2) comprises first (4) and second (5) diametrically opposite structurally identical magnetizing assemblies which are arranged on either end of a ferromagnetic central part (6). Each magnetizing assembly (4, 5) comprises a polygonal, uniformly magnetized central magnet (7, 14) and laterally surrounded by a uniformly magnetized magnetic belt (13, 20). The magnetic flux, generated by the generator (1), forms a single loop concentrated through the air gaps (42, 43).

8 Claims, 10 Drawing Sheets

(56) References Cited

U.S. PATENT DOCUMENTS

| | | |
|---|---|---|
| 8,378,769 B2 * | 2/2013 | Heitzler et al. ............... 335/306 |
| 8,395,468 B2 * | 3/2013 | Stephenson et al. .......... 335/306 |
| 2005/0046533 A1 | 3/2005 | Chell |
| 2006/0077027 A1 * | 4/2006 | Aoki ............................ 335/306 |
| 2012/0139676 A1 * | 6/2012 | Sari et al. ...................... 335/219 |

OTHER PUBLICATIONS

Written Opinion Corresponding to PCT/FR2013/000046 mailed Sep. 13, 2013, 5 pages.

* cited by examiner

MAGNETIC FIELD GENERATOR FOR MAGNETOCALORIC THERMAL APPLIANCE This application is a National Stage completion of PCT/FR2013/000046 filed Feb. 21, 2013, which claims priority from French patent application serial no. 12/51803 filed Feb. 28, 2012.

FIELD OF THE INVENTION

The present invention relates to a magnetic field generator for a magnetocaloric thermal appliance comprising a first and a second magnetizing structure mounted opposite to each other, parallel, and arranged to define at least two diametrically opposite air gaps, each magnetizing structure comprising a first and a second structurally identical magnetizing assemblies, diametrically opposite and arranged on either side of a ferromagnetic central part, each first and second magnetizing assembly comprising a first, respectively a second, polygonal, uniformly magnetized central magnet comprising an active side on the side of the air gap and a passive side, parallel with each other and comprising at least four sides, with the magnetic induction vector of each central magnet perpendicular to its active and passive sides, said other sides, called lateral sides of each central magnet being quadrangular, perpendicular to said active and passive sides and in contact with the sides called internal sides of a uniformly magnetized magnetic belt surrounding each central magnet and comprising external sides parallel to said internal sides, the magnetic induction vectors in each magnetic belt being perpendicular to its internal sides, said first and second magnetizing assemblies being connected to said ferromagnetic part by means of every corresponding magnetic belt.

BACKGROUND OF THE INVENTION

Magnetic refrigeration technology at ambient temperature has been known for more than twenty years and its advantages in terms of ecology and sustainable development are widely acknowledged. Its limits in terms of its useful calorific output and its thermal performance are also well known. Consequently, all the research undertaken in this field tends to improve the performances of the magnetocaloric thermal appliances, by adjusting the various parameters, such as the intensity of the magnetic field, the performances of the magnetocaloric material, the heat exchange surface between the heat transfer fluid and the magnetocaloric materials, the performances of the heat exchangers, etc.

In these appliances, it is indispensable to generate a uniform and intense magnetic field in at least one air gap wherein at least one element out of magnetocaloric material is placed and removed. The higher the magnetic field, the stronger the magnetocaloric effect of the element out of magnetocaloric material, which leads to an increase in thermal output and therefore in efficiency of a magnetocaloric thermal appliance.

Moreover, in certain areas, the compactness of the thermal appliance is essential and leads to a rotary configuration or structure wherein the magnetic system is in relative movement with respect to the magnetocaloric material(s). Such a rotary configuration has the advantage of showing a good magnetocaloric material per used volume ratio. Since the thermal output of the thermal appliance depends in particular on the quantity of magnetocaloric material used, such arrangement is actually very advantageous.

Publications WO 2005/074608 A2 and US 2005/0046533 A1 describe a magnetic field generator as defined in the preamble of claim 1, comprising in particular two diametrically opposite air gaps wherein a magnetic flux circulates in the same direction but belongs to two distinct magnetic loops, the return of the magnetic loops taking place through the central axis of the generator, which corresponds to the rotary axis of said generator.

Now, this central axis made out of a magnetically permeable material must be thick enough, and therefore show enough material, to allow conducting the magnetic induction flux of the two magnetic loops without leading to magnetic saturation. This generator type therefore has a major drawback that consists in its high weight which on the one hand makes it difficult to handle and, on the other hand increases accordingly the weight of the magnetocaloric thermal appliance it is integrated in.

For this reason, there is today no magnetic generator with a reduced size, a limited weight, low manufacturing costs, that can be mounted in a rotary appliance and is able to generate a magnetic field of at least one tesla.

SUMMARY OF THE INVENTION

The present invention aims to overcome these drawbacks by proposing a magnetic field generator intended to be integrated in a magnetocaloric thermal appliance. This magnetic field generator is able to create an intense and uniform magnetic field in at least two air gaps, each air gap being delimited by two central magnets opposite to each other. Moreover, the magnetic field generator according to the invention is also easy to manufacture, easy to assemble and includes components with simple geometrical shapes and therefore with low production costs.

To that purpose, the invention relates to a magnetic field generator for a magnetocaloric thermal appliance, characterized in that the first and second magnetizing structures are identical and arranged so that the active side of the first central magnet of the first magnetizing structure is opposite to the active side of the second central magnet of the second magnetizing structure and that the active side of the second central magnet of the first magnetizing structure is opposite to the active side of the first central magnet of the second magnetizing structure, in that the magnetic induction vector of said first central magnet is oriented towards its active side and the magnetic induction vectors in the magnetic belt surrounding said first central magnet are directed towards its internal sides, in that the magnetic induction vector of said second central magnet is oriented towards its passive side and the magnetic induction vectors in the magnetic belt surrounding said second central magnet are directed towards its external sides, and in that the magnetic flux generated by said magnetic field generator forms one single loop and circulates, in the first magnetizing structure, from the second to the first magnetizing assembly, in the second magnetizing structure, from the second to the first magnetizing assembly and, between the two magnetizing structures, through said air gaps, from the active side of the first central magnet of the first magnetizing structure to the active side of the second central magnet of the second magnetizing structure and from the active side of the first central magnet of the second magnetizing structure to the active side of the second central magnet of the first magnetizing structure.

According to the invention, a magnetic concentration piece made out of a ferromagnetic material can be superimposed to the active side of each central magnet and be surrounded by said magnetic belt.

Moreover, each central magnet can include a magnetic concentration piece made out of a ferromagnetic material arranged between two permanent magnets, the whole being surrounded by said magnetic belt.

The first and second central magnets can be made of several permanent magnets.

Said first and second magnetizing structures can be mounted each in a frame that forms a support made out of a ferromagnetic material.

As a variant, said first and second magnetizing structure can be mounted each in a frame that forms a support made out of a non-magnetic material.

The generator according to the invention can also include a third magnetizing structure comprising two polygonal, uniformly magnetized central magnets arranged respectively between the first and second central magnets of said first and second magnetizing structures, said central magnets of said third magnetizing structure comprising a first active side and a second active side parallel to each other and to the active sides of the first and second central magnets, the magnetic induction vector of each of said central magnets of said third magnetizing structure can have the same orientation and the same direction as the induction vectors of the first and second central magnets between which they are arranged, and they can form four air gaps superimposed two by two and diametrically opposite two by two.

According to the invention, the magnetic belts can be made of several polygonal permanent magnets.

The magnetocaloric elements liable to be positioned in the air gaps of the magnetic field generator according to the invention are intended to be in contact with a heat transfer fluid. This heat transfer fluid circulates from their cold end towards their hot end during a first phase of the magnetic cycle that corresponds to a phase wherein the magnetocaloric materials or elements are subjected to an increase of their temperature (when they are positioned inside an air gap) and from their hot end towards their cold end during a second phase of the magnetic cycle wherein the magnetocaloric materials or elements are subjected to a decrease of their temperature (when they are positioned outside the air gap). The thermal contact between the heat transfer fluid and the magnetocaloric elements can be achieved with a heat transfer fluid passing along or through magnetocaloric materials. To that purpose, the magnetocaloric elements can be made of one or several magnetocaloric materials and can be permeable to the heat transfer fluid. They can also include circulation passages for the fluid extending between the two ends of the magnetocaloric materials. These passages can be achieved by the porosity of the magnetocaloric materials or by channels machined or obtained using a set of plates out of magnetocaloric material.

The heat transfer fluid is preferably a liquid. To that purpose, it is possible for example to use pure water or water with antifreeze, a glycolated product or a brine.

BRIEF DESCRIPTION OF THE DRAWINGS

The present invention and its advantages will be better revealed in the following description of embodiments given as non limiting examples, in reference to the drawings in appendix, in which.

DETAILED DESCRIPTION OF THE PREFERRED EMBODIMENTS

In the illustrated embodiments, the identical pieces or parts have the same numerical references.

Figure 1:
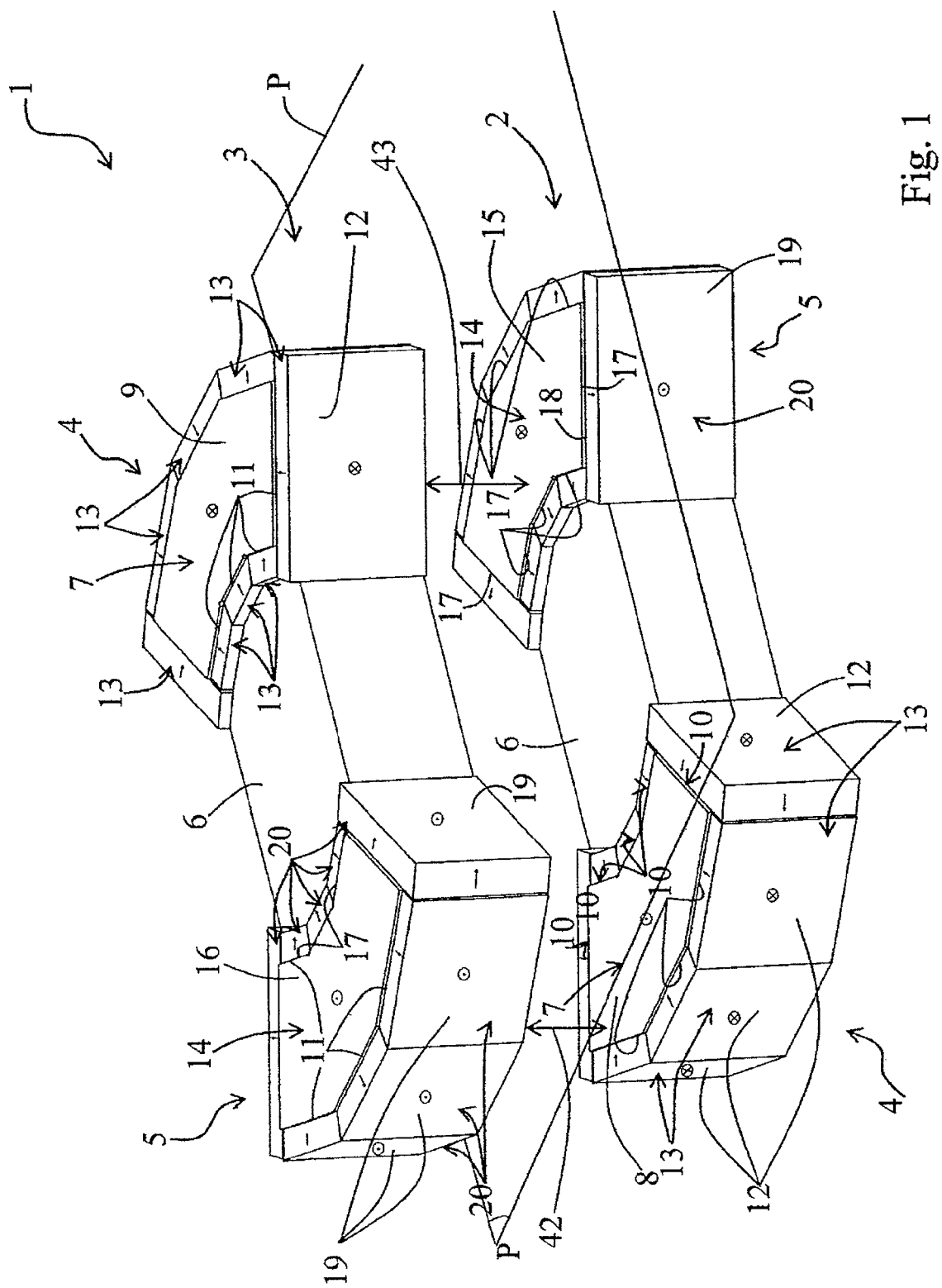
FIG. 1 is a perspective view of a magnetic field generator according to the invention.

FIG. 1 is a first embodiment of a magnetic field generator 1 according to the invention. This magnetic field generator 1 comprises a first magnetizing structure 2 and a second magnetizing structure 3 that are identical, parallel, mounted head-to-tail and arranged opposite to each other to delimit between them two diametrically opposite air gaps 42, 43. Each magnetizing structure 2, 3 comprises a first magnetizing assembly 4 and a second magnetizing assembly 5. The two magnetizing structures 2 and 3 are arranged parallel with respect to each other, on either side of a plane P and so that the first magnetizing assembly 4 of the first magnetizing structure 2 is opposite to the second magnetizing assembly 5 of the second magnetizing structure 3 and that the second magnetizing assembly 5 of the first magnetizing structure 2 is opposite to the first magnetizing assembly 4 of the second magnetizing structure 3. The magnetizing assemblies 4, 5 of each magnetizing structure 2, 3 are connected together by a ferromagnetic part or element 6.

The fact that the two magnetizing structures 2, 3 that form the magnetic field generator 1 are identical meets the requirements for an optimization of the production costs for the manufacture of said generator according to the invention. It actually allows reducing the number of parts necessary for its manufacture, thus facilitating its assembly, the referencing of the parts and the management of the inventory.

In the example illustrated in FIG. 1, each magnetizing assembly 4, 5 is uniformly magnetized and includes a central magnet 7, respectively 14, whose induction vector is perpendicular to plane P. In a magnetizing structure 2, 3, the direction of the induction vector of the first central magnet 7 of the first magnetizing assembly 4 is reversed with respect to the direction of the magnetic induction vector of the second central magnet 14 of the second magnetizing assembly 5. The shape of the central magnet 7, 14 can be different from the one represented, it is adapted to the shape or to the volume of the magnetocaloric materials that are to be subjected to the magnetic field of the central magnets 7, 14.

To that purpose, considering the first magnetic structure 2 of the generator of FIG. 1, represented in the lower section of the drawing, the first central magnet 7 of the first magnetizing assembly 4 has an active side 8 on the side of the air gap 42, 43, located towards plane P and from which the magnetic induction flux exits. Likewise, the second central magnet 14 of the second magnetizing assembly 5 of this first magnetizing structure 2 has an active side 15 on the side of the air gap 42, 43, located towards plane P and in which the magnetic induction flux enters. In addition, the active sides 8 and 15 are located in a same plane. The magnetic induction vector present in the first central magnet 7 is directed towards plane P while the direction of the induction vector present in the second central magnet 14 is opposite to plane P, these two vectors being perpendicular to plane P. The first central magnet 7, as well as the second central magnet 14, is made of a decagonal permanent magnet whose active side 8, 15 and passive side 9, 16 are parallel to each other. The other sides, called lateral sides 10, 17, are all rectangular and perpendicular to the respective active sides 8, 15 and passive sides 9, 16. Of course, the first and second central magnets 7, 14 can have another shape such as a prism or a parallelogram for example.

The central magnets 7, 14 are surrounded laterally by a magnetic belt 13, 20 made of several permanent magnets or permanent magnet plates. So, each lateral side 10, 17 of a central magnet 7, 14 is in contact with a side called internal side 11, 18 of the magnetic belt 13, 20. This internal side 11, 18 corresponds to that of the permanent magnets forming said magnetic belt 13, 20. The permanent magnets forming each magnetic belt 13, 20 are hexahedrons whose internal side 11, 18 is parallel to their external side 12, 19 that forms the external side of said magnetic belt 13, 20. Of course, any other shape can be considered for the permanent magnets forming the magnetic belt 13, 20. The magnetic induction vector in the magnetic belt 13, 20 is perpendicular at any point to the lateral sides of the central magnets 7, 14. In the first magnetizing assembly 4, the magnetic induction vector of the magnetic belt 13 is oriented towards the first central magnet 7 while in the second magnetizing assembly 5, the magnetic induction vector of the magnetic belt 20 is oriented in the opposite direction, that is to say it moves away from or is opposite to the second central magnet 14. Thanks to the magnetic belts 13, 20, and in particular thanks to the orientation of the induction vectors of the latter, the magnetic field of the central magnets 7, 14 is intensified and the circulation of the flux lines through the ferromagnetic part 6 is facilitated.

The first and the second magnetizing assemblies 4, 5 are connected through a part 6 made out of a ferromagnetic material such as iron. In a magnetizing structure 2, this part is capable of guiding the magnetic flux lines exiting from the second magnetizing assembly 5 towards the first magnetizing assembly 4. To that purpose, the permanent magnets that form the magnetic belts 13, 20 are mounted respectively between the first central magnet 7 and the ferromagnetic part 6 and between the second central magnet 14 and the ferromagnetic part 6.

Figure 3:
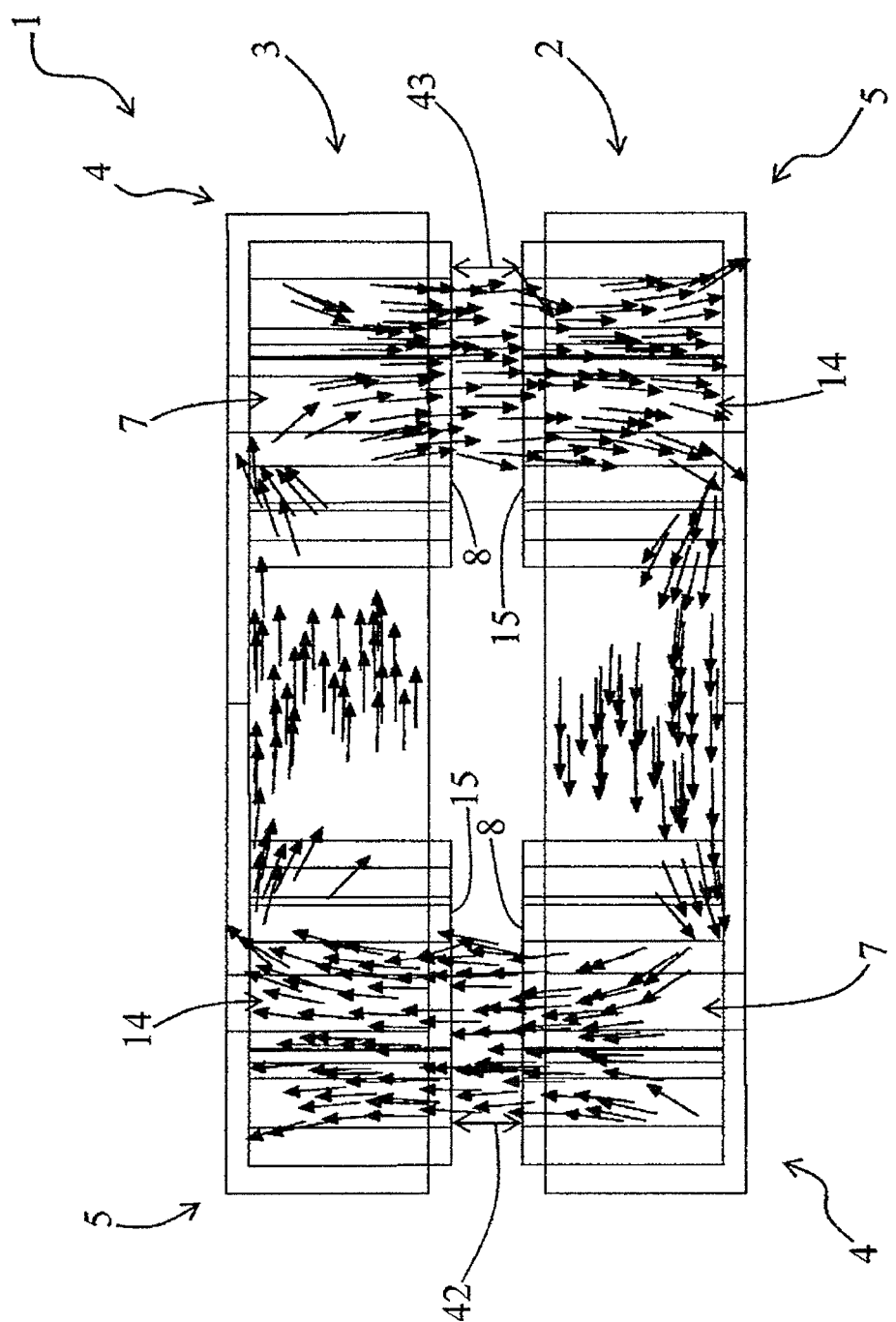
FIG. 3 is a vertical cross-sectional view of the generator of FIG. 1 wherein the magnetic field lines are represented.

The second magnetizing structure 3 (illustrated in the upper section of FIG. 1) is identical to the first magnetizing structure 2. It is arranged with respect to plane P so that the active sides 8 and 15 of the first and second central magnets 7, 14 are opposite and parallel to plane P and so that the first magnetizing assembly 4 of the first magnetizing structure 2 is opposite to the second magnetizing assembly 5 of the second magnetizing structure 3, while the second magnetizing assembly 5 of the first magnetizing structure 2 is opposite to the first magnetizing assembly 4 of the second magnetizing structure 3. This way, two central magnets 7, 14 opposite to each other and arranged on either side of plane P have induction vectors with the same direction and same orientation and delimit respectively an air gap 42, 43. Thus the magnetic field generator 1 according to the invention has two air gaps 42, 43. The first air gap 42 is located on the left on FIG. 1 and is formed by the free volume between the first magnetizing assembly 4 of the first magnetizing structure 2 and the second magnetizing assembly 5 of the second magnetizing structure 3 and the magnetic flux lines are oriented towards the upper section of FIG. 1 (upwards). The second air gap 43 is located on the right on FIG. 1 and is formed by the free volume between the second magnetizing assembly 5 of the first magnetizing structure 2 and the first magnetizing assembly 4 of the second magnetizing structure 3 and the magnetic flux lines are oriented towards the lower section of FIG. 1 (downwards). The magnetic field generator 1 provides one single magnetic loop that circulates, between the first and second magnetizing structures 2 and 3, through the air gaps 42, 43 wherein it concentrates. To facilitate understanding, FIG. 3 illustrates to that purpose with arrows the magnetic flux lines that circulate in the magnetic field generator 1.

The magnetic field generator 1 represented in FIG. 1 can be mounted in or carried by a housing or a support made out of a non-magnetic and/or ferromagnetic material.

Figure 2:
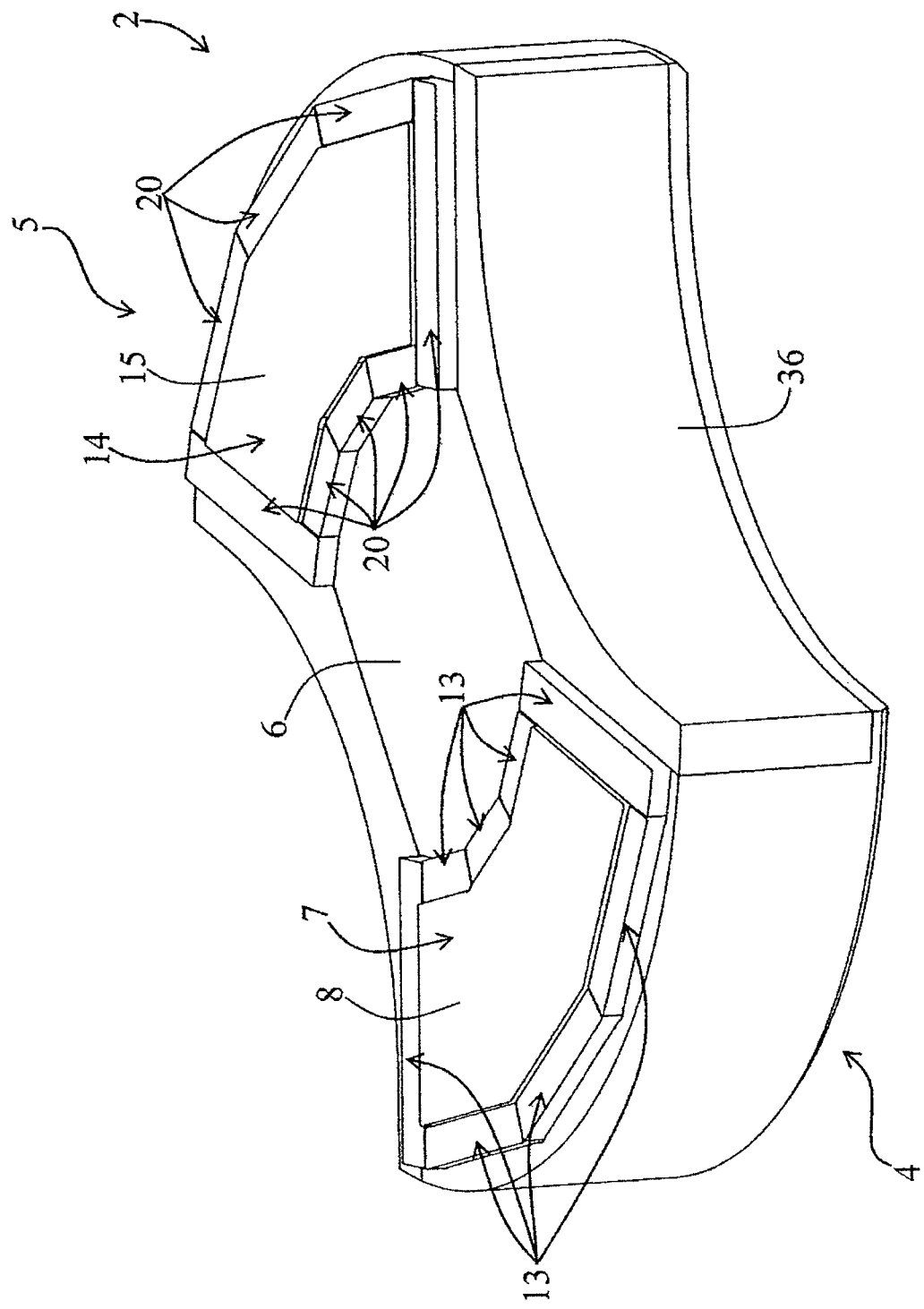
FIG. 2 represents a magnetizing structure of the magnetic field generator of FIG. 1 mounted in a frame that forms a support.

To that purpose, FIG. 2 represents the first magnetizing structure 2 of the magnetic field generator 1 of FIG. 1 mounted in a frame 36 out of a non-magnetic material. This frame allows holding in position the various parts with respect to each other without interfering in the magnetic flux thanks to the use of a non-magnetic material such as aluminum, a plastic or any other equivalent material.

Figure 4:
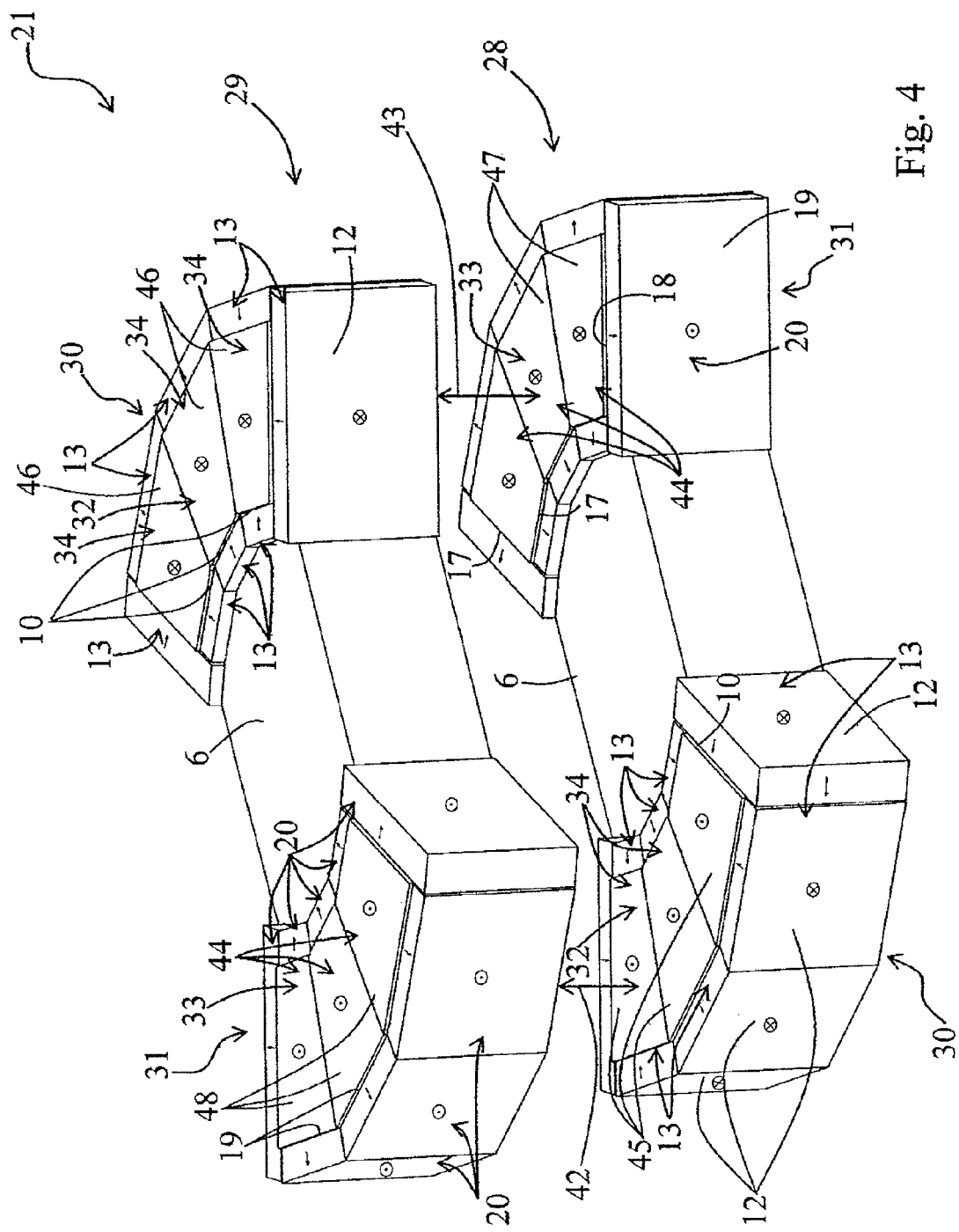
FIG. 4 is a perspective view of a first embodiment variant of the magnetic field generator according to the invention.

FIG. 4 represents a first variant of the magnetic field generator 1 of FIG. 1 that differs by the structure of the first 32 and second 33 central magnets. This magnetic field generator 21 also comprises a first 28 and a second 29 identical magnetizing structures arranged opposite to each other with respect to a plane P. The first central magnet 32 comprises three identical permanent magnets 34 having a four-side polyhedral shape, assembled with each other and whose induction vector is the same as that of the first central magnet 7 represented in the magnetic field generator 1 of FIG. 1. Likewise, the second central magnet 33 also comprises three identical permanent magnets 44 having a four-side polyhedral shape, assembled with each other and whose induction vector is the same as that of the second central magnet 14 represented in the magnetic field generator 1 of FIG. 1. Manufacturing several permanent magnets 34, 44 instead of one single larger permanent magnet 7, 14 is more cost-effective. Moreover, magnetizing small parts is easier and the magnetic field achieved in the latter is more homogeneous, which allows on the one hand reducing the manufacturing costs of the central magnets 32, 33 and, on the other hand, improving the homogeneity of the magnetic field in the corresponding air gaps 42, 43. In this configuration too, the active side 45, 47 of the permanent magnets 34, 44 that form the central magnets 32, 33 is parallel to their passive side 46, 48. The air gaps 42 and 43 of this magnetic field generator 21 are delimited on the one hand by the active side 45 of the permanent magnets 34 of the first central magnet 32 of the first magnetizing structure 28 and the active side 47 of the permanent magnets 44 of the second central magnet 33 of the second magnetizing structure 29 and, on the other hand, by the active side 47 of the permanent magnets 44 of the second central magnet 33 of the first magnetizing structure 28 and the active side 45 of the permanent magnets 34 of the first central magnet 32 of the second magnetizing structure 29.

Figure 5:
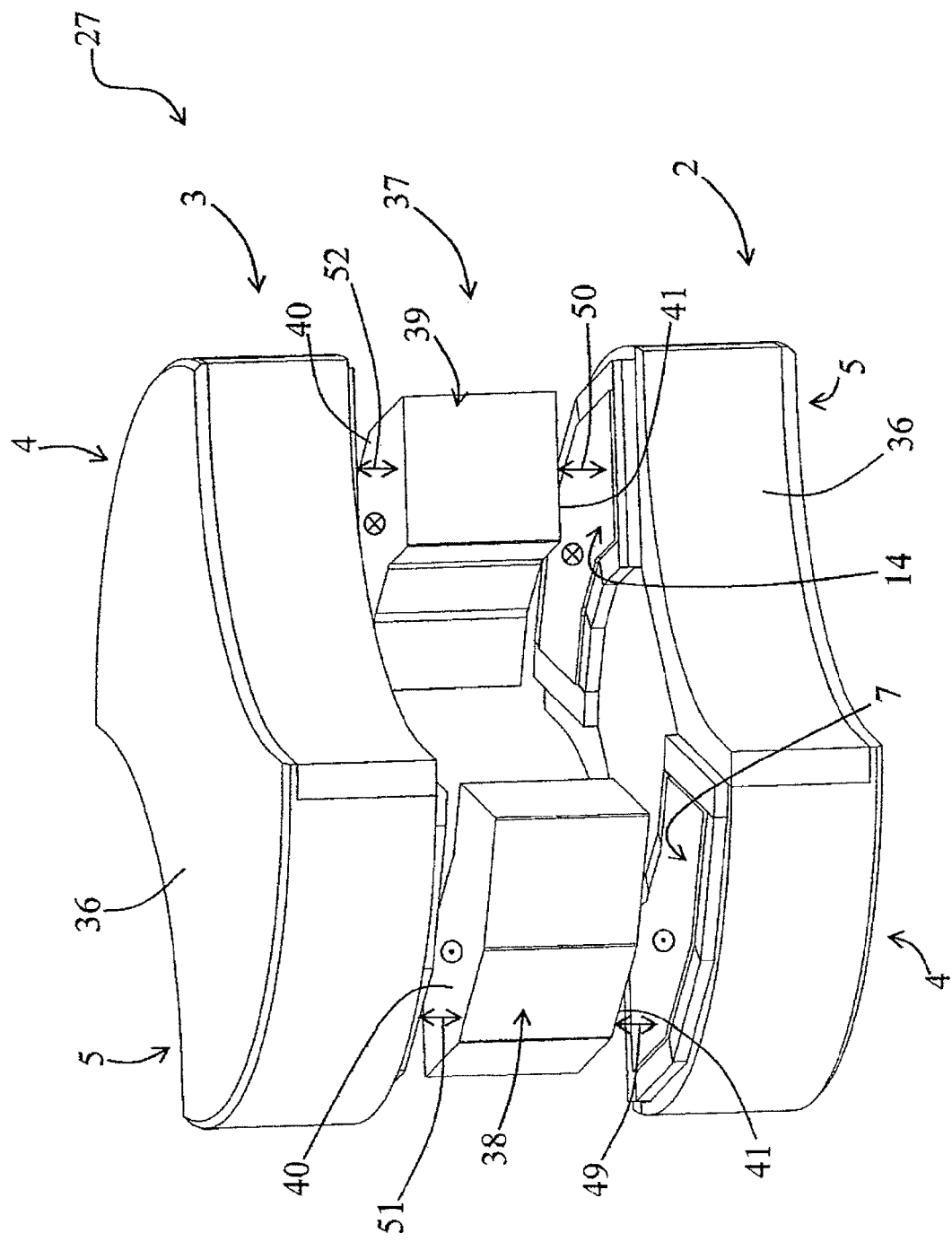
FIG. 5 is a perspective view of a second embodiment variant of the magnetic field generator according to the invention.

FIG. 5 represents a second embodiment variant of the magnetic field generator 27. This magnetic field generator 27 corresponds to that of FIG. 1 mounted in a frame 36 as represented in FIG. 2 and wherein a third magnetizing structure 37 has been mounted. This third magnetizing structure 37 comprises two polygonal and uniformly magnetized central magnets 38 and 39. A first central magnet 38 is mounted between the first magnetizing assembly 4 of the first magnetizing structure 2 and the second magnetizing assembly 5 of the second magnetizing structure 3, while the other central magnet 39 is mounted between the second magnetizing assembly 5 of the first magnetizing structure 2 and the first magnetizing assembly 4 of the second magnetizing structure 3 The central magnets 38, 39 comprise two active sides 40 and 41 parallel to each other and to the active sides 8, 15 of the central magnets 7, 14 of the first and second magnetizing structures 2, 3. As an example, the central magnets 38, 39 can be made out of one single permanent magnet, out of several permanent magnets or comprise a so-called sandwich structure comprising permanent magnets mounted on each side of a part out of a ferromagnetic material. Moreover, to allow achieving a continuous magnetic loop with an intense magnetic field, the magnetic induction vector of each of the central magnets 38, 39 has the same orientation and the same direction as the induction vectors of the first and second central magnets 7, 14 between which they are arranged.

Of course, and even though this is not represented, this third magnetizing structure 37 can also be mounted in a non-magnetic frame or housing. It has the advantage of providing four air gaps 49, 50, 51, 21 with a limited size and a reduced weight. Also in this embodiment, the magnetic field flux circulates in one single magnetic loop and, between the various magnetizing structures 2, 3 and 37, only through the air gaps 49, 50, 51, 52.

Figure 6:
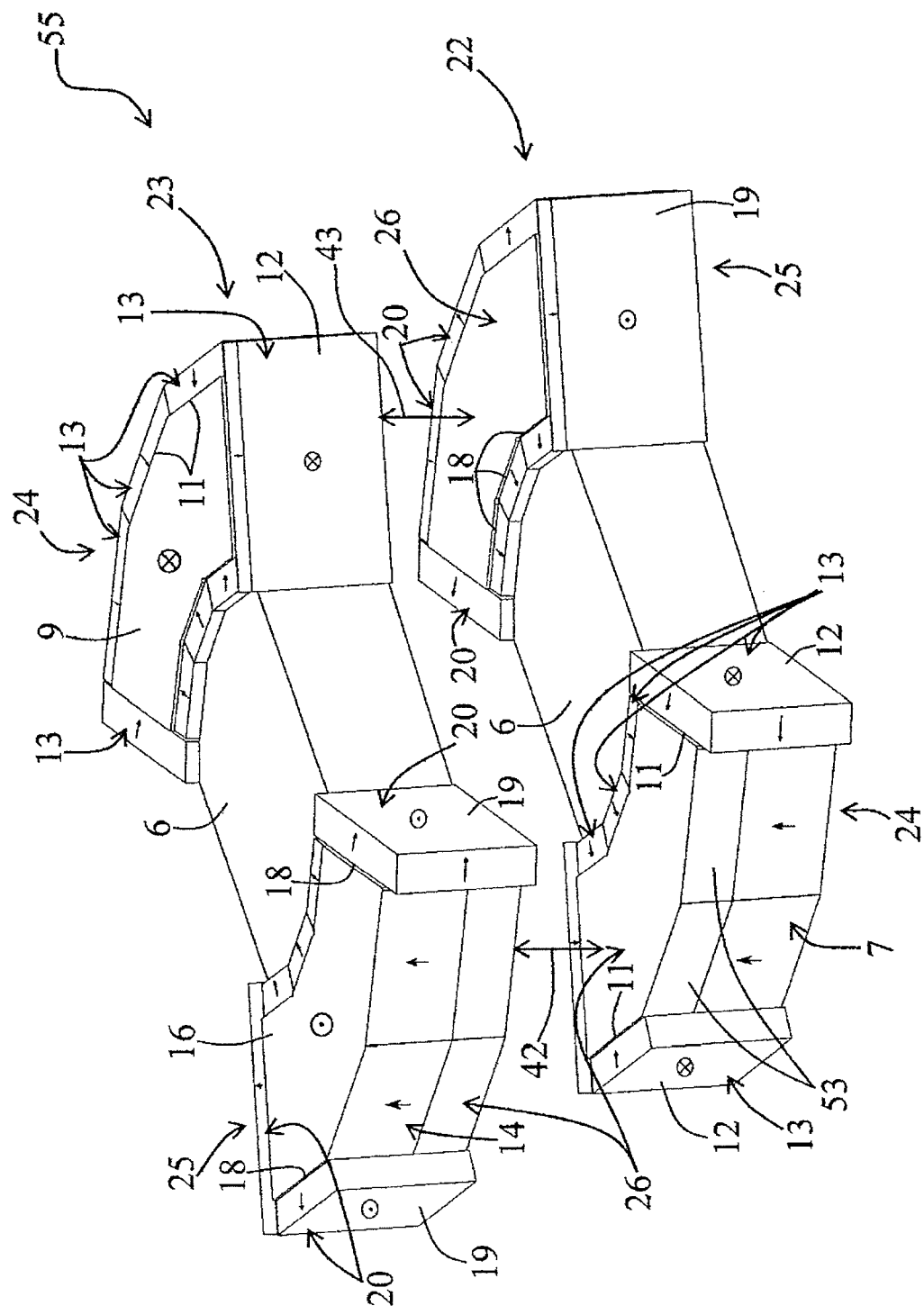
FIG. 6 is a perspective view of a third embodiment variant of the magnetic field generator according to the invention.

FIG. 6 represents a third embodiment variant of a magnetic field generator 55 that differs from the magnetic field generator 1 of FIG. 1 by the configuration of the first 24 and second 25 magnetizing assemblies. Each central magnet 7, 14 is topped on its active side 8, 15 with a pole piece or magnetic concentration piece 26 made out of a ferromagnetic material. Such a pole piece 26 allows concentrating the magnetic flux coming from the magnetic belt 13, 20 and from the central magnet 7, 14 in the air gaps 42, 43. As for the central magnet 7, 14, the lateral sides 53 of the pole piece 26 are in contact with the internal sides 11, 18 of the magnetic belt 13, 20. To facilitate understanding, two permanent magnets of the magnetic belts 13, 20 have been removed from the first magnetizing assembly 24 of the first magnetizing structure 22 and from the second magnetizing assembly 25 of the second magnetizing structure 23.

In the magnetic field generator 55 represented in FIG. 6, the central magnets 7, 14 are manufactured in one single part using one single permanent magnet. It can however be provided to manufacture these central magnets 7, 41 by juxtaposing several permanent magnets, as illustrated for example in the magnetic field generator 21 of FIG. 4.

The magnetic field generator 55 represented in FIG. 6 can be mounted in or carried by a housing or a support made out of a non-magnetic or ferromagnetic material to hold the various parts in position with respect to each other.

Figure 7A:
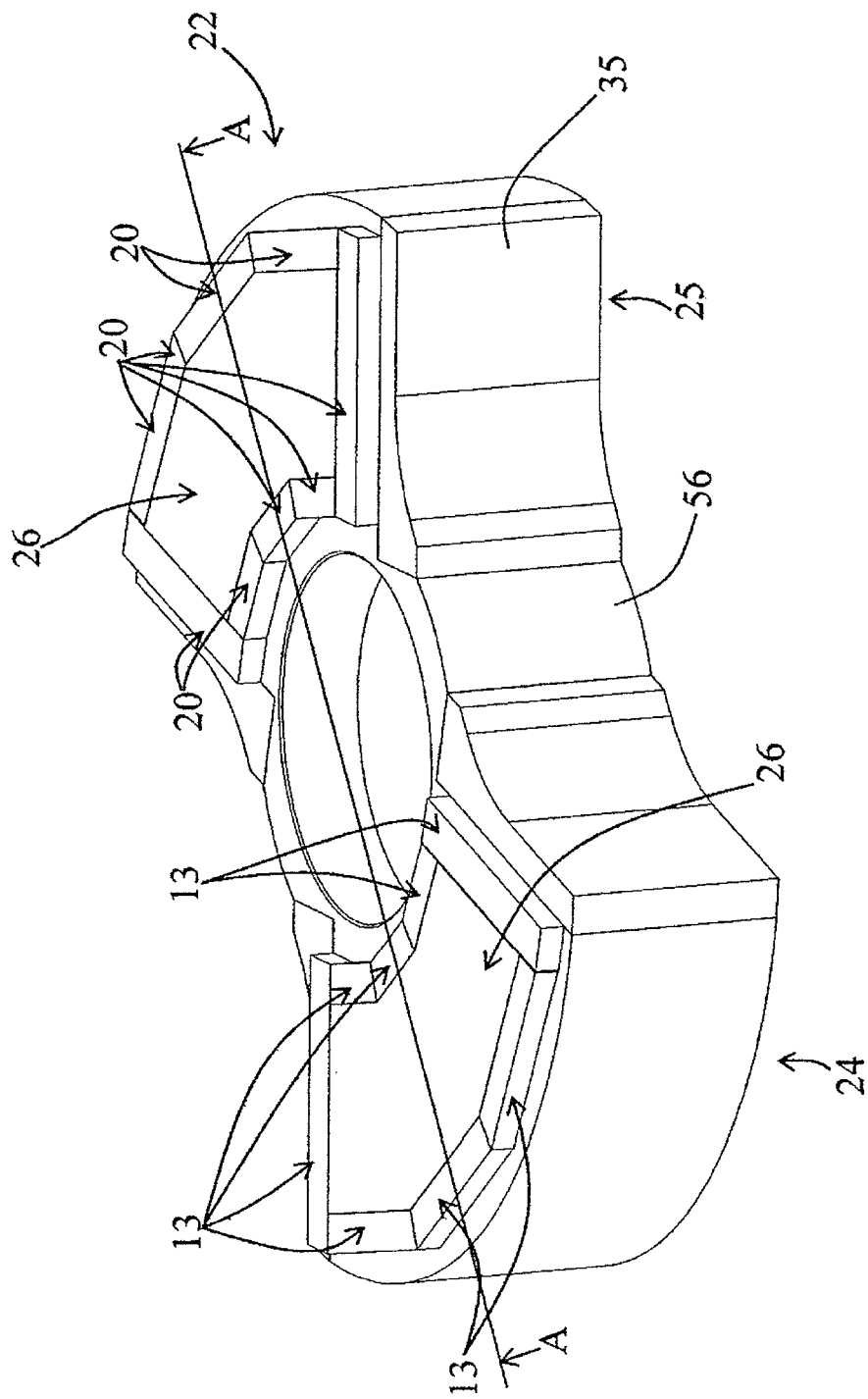
FIG. 7A is a simplified perspective view of a magnetizing structure of the magnetic field generator of FIG. 6 mounted in a frame that forms a support.
Figure 7B:
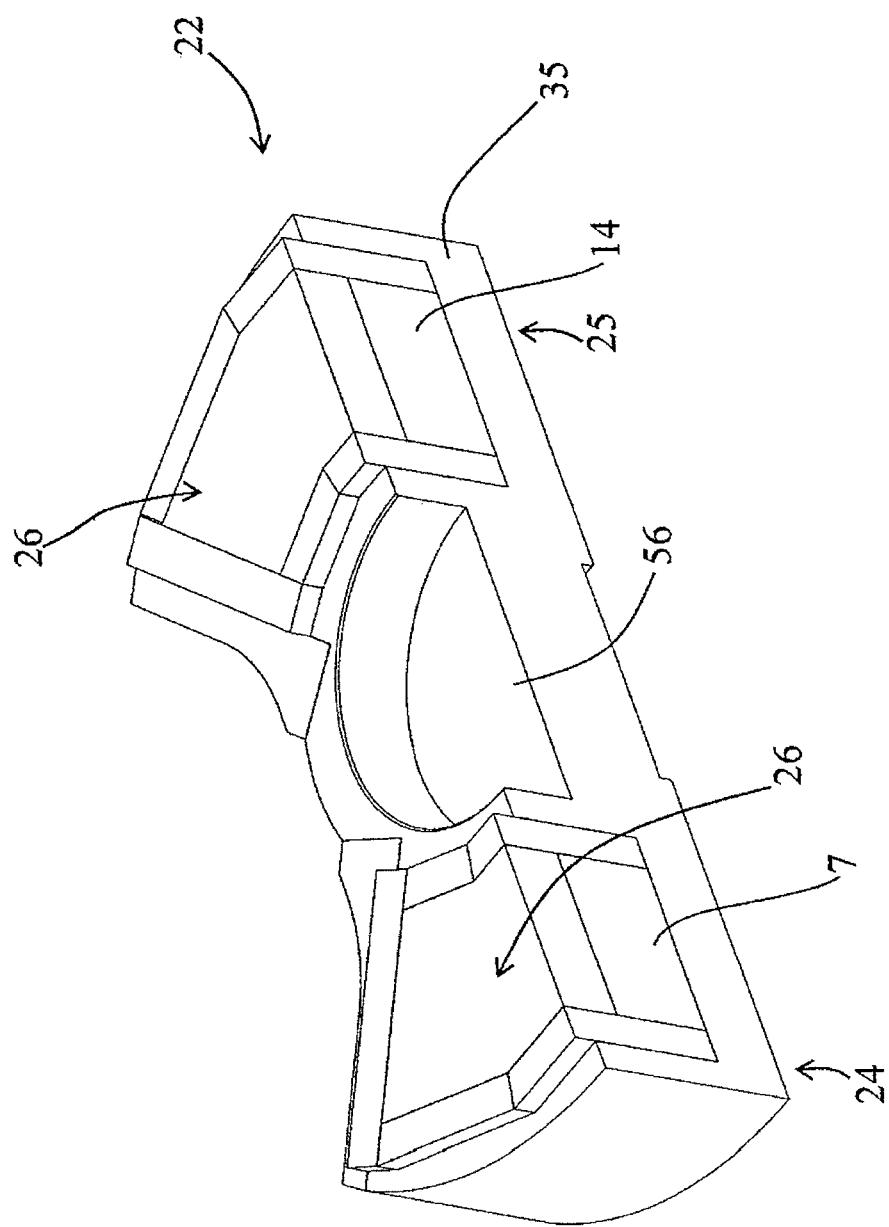
FIG. 7B is a cross-sectional view along plane A-A of FIG. 7A.

To that purpose, FIGS. 7A and 7B represent the magnetizing assemblies 24 and 25 of the magnetic field generator 55 of FIG. 6 mounted each in a frame 35 made out of a ferromagnetic material, and wherein the ferromagnetic part 56 is an integral part of said frame 35. Such configuration is also possible with the magnetizing assemblies 4, 5, 30, 31 of the other embodiment variants. It allows optimizing the use of the magnetic flux generated by the magnetic belts 13, 20 and preventing a possible magnetic saturation.

The material of frame 35 can be for example iron, or any other equivalent material permeable to the magnetic flux.

Figure 8:
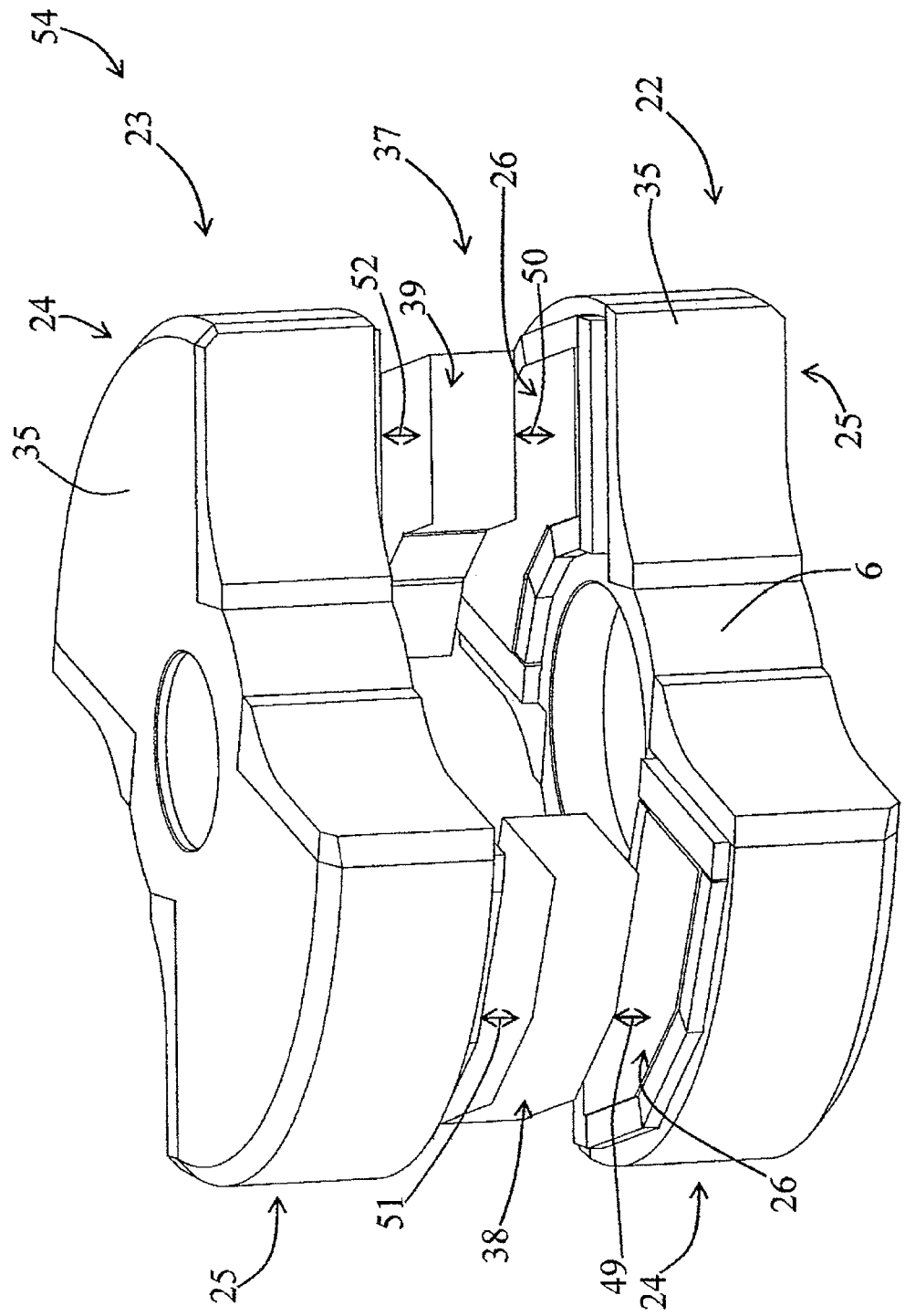
FIG. 8 is a perspective view of a fourth embodiment variant of the magnetic field generator according to the invention.

FIG. 8 represents another embodiment variant of the magnetic field generator 54. The magnetic field generator 54 uses the magnetizing structures 22, 23 of FIGS. 7A and 7B and integrates in addition a third magnetizing structure 37, the same way as in the magnetic field generator 27 represented in FIG. 5. This third magnetizing structure 37 comprises two polygonal and uniformly magnetized central magnets 38 and 39. Also in this example, the magnetic induction vector of each of the central magnets 38, 39 has the same orientation and the same direction as the induction vectors of the first and second central magnets 7, 14 topped with a pole piece 26 between which they are arranged.

The same advantages and remarks as those described with respect to the integration of the third magnetizing structure 37 in relation with the magnetic field generator 27 of FIG. 5 apply for the magnetic field generator 54 of FIG. 8. Moreover, the magnet providing the third magnetizing structure 37 can be in one piece or it can be made of an assembly of several permanent magnets, as shown for the central magnets 32, 33 of FIG. 4.

Figure 9:
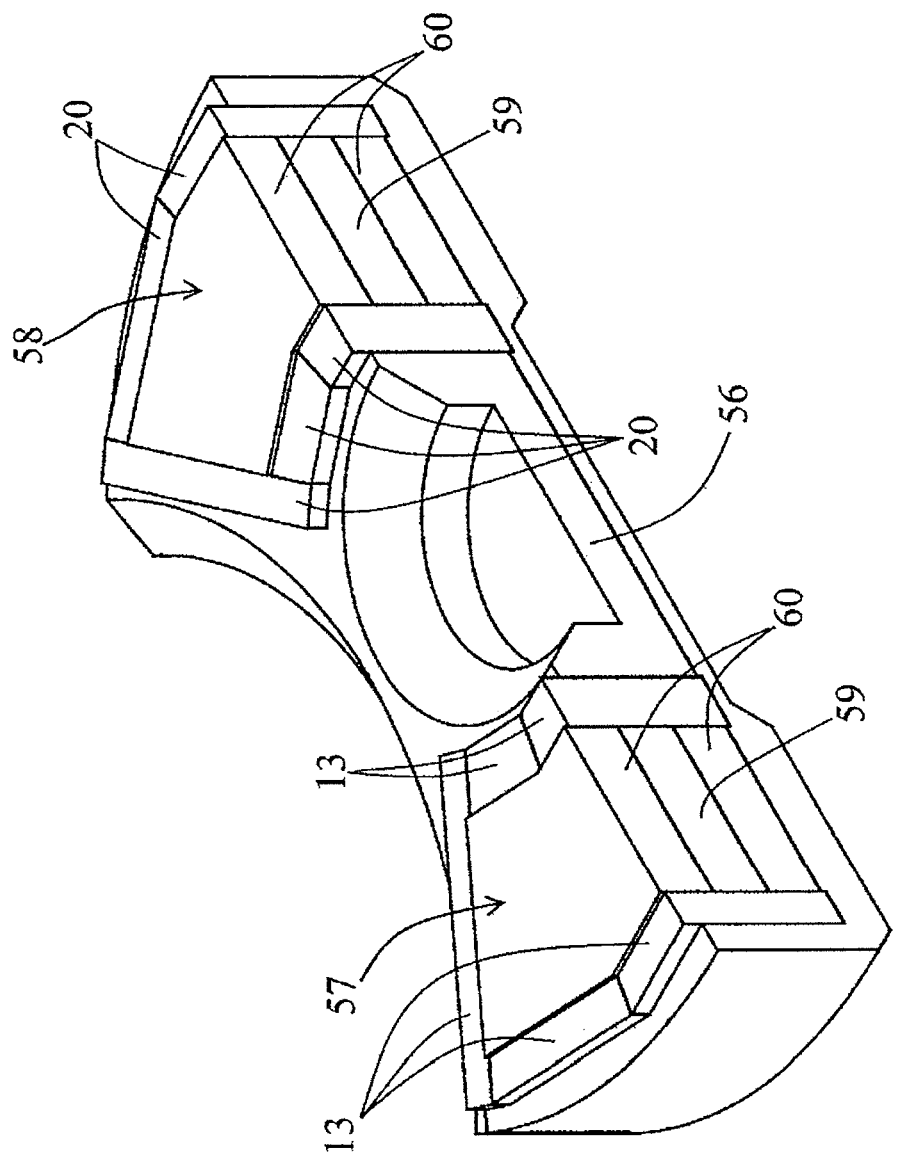
FIG. 9 is another embodiment variant according to a view similar to that of FIG. 7B.

FIG. 9 represents another embodiment variant of the first and second magnetizing assemblies wherein the first 57 and second 58 central magnets are realized according to a so-called sandwich structure comprising three parallel layers. These layers comprise a central layer made of a pole piece 59 made out of a ferromagnetic material arranged between two layers of permanent magnets 60. Each permanent magnet 60 can be made of one single permanent magnet or of several permanent magnets. With respect to the other variants, such configuration allows reducing the quantity of permanent magnets required in a central magnet 57, 58 and therefore reducing the costs linked with the material without reducing the magnetic field present in the air gaps.

The magnetic field generators 1, 21, 27, 55 and 54 illustrated by all of the figures are intended to be integrated in a thermal appliance including at least one magnetocaloric element. This magnetocaloric element can be made of one or several magnetocaloric materials and is crossed by or in thermal contact with a heat transfer fluid that circulates alternately in two opposite directions according to the position of said magnetocaloric element in and outside an air gap 42, 43, 49, 50, 51, 52.

The magnetic field generators 1, 21, 27, 55, 54 represented comprise at least two diametrically opposite air gaps 42, 43, 49, 50, 51, 52 allowing also to activate magnetically at least two magnetocaloric elements simultaneously in comparison with known magnetic field generators and therefore to increase the performance of a thermal device including said magnetic field generator 1, 21, 27, 55, 54 while still keeping a small size.

Preferably, the magnetocaloric element and the magnetic field generator 1, 21, 27, 55, 54 are mounted with the possibility of a relative movement of one with respect to the other, so that said magnetocaloric element can be located alternately in and outside an air gap 42, 43, 49, 50, 51, 52. This position change can be achieved for example by means of a continuous rotation of the magnetic field generator 1, 21, 27, 55, 54 with respect to said magnetocaloric element or by a reciprocating movement.

The invention advantageously allows achieving a magnetic field exceeding 1.1 tesla in each air gap 42, 43, 49, 50, 51, 52 thanks to the use of permanent magnets whose magnetic remanence lies between 1.37 and 1.43 tesla for the production of the central magnets 7, 14, 32, 33, 38, 39 and of the external magnetic units 13, 20. Furthermore, and in a particularly advantageous way, such a magnetic field intensity can be achieved in the air gaps 42, 43 whose height corresponds approximately to one third of the height of the central magnets 7, 32, 57, 14, 33, 58.

Possibilities for Industrial Application:

This description shows clearly that the invention allows reaching the goals defined, that is to say offer a magnetic field generator whose production is structurally simple, cost-effec-

The invention claimed is:

1. A magnetic field generator (1, 21, 27, 54, 55) for a magnetocaloric thermal appliance comprising:
    first (2, 22, 28) and second (3, 23, 29) magnetizing structures mounted opposite and parallel to one another and arranged to define at least two diametrically opposite air gaps (42, 43, 49, 50, 51, 52),
    each magnetizing structure (2, 22, 28, 3, 23, 29) comprising a first (4, 24, 30) and a second (5, 25, 31) diametrically opposite, structurally identical magnetizing assemblies and arranged on either side of a ferromagnetic central part (6, 56),
    each first (4, 24, 30) and second (5, 25, 31) magnetizing assembly respectively comprising a first (7, 32, 57) and a second (14, 33, 58), polygonal, uniformly magnetized central magnet comprising an active side (8, 45, 15, 47), on a side of an air gap, and a passive side (9, 46, 16, 48), parallel with each other and comprising at least four sides, with a magnetic induction vector of each central magnet (7, 32, 14, 33) perpendicular to the active (8, 45, 15, 47) and passive (9, 46, 16, 48) sides,
    other, lateral sides (10) of each central magnet (7, 32, 14, 33, 58) being quadrangular, perpendicular to the active (8, 45, 15, 47) and the passive (9, 46, 16, 48) sides and in contact with internal sides (11, 18) of a uniformly magnetized magnetic belt (13, 20) surrounding each central magnet (7, 14) and comprising external sides (12, 19) parallel to the internal sides (11, 18),
    the magnetic induction vectors, in each magnetic belt (13, 20), being perpendicular to its internal sides (11, 18),
    the first and the second magnetizing assemblies (4, 24, 30, 5, 25, 31) being connected to the ferromagnetic part (6, 56) by means of every corresponding magnetic belt (13, 20),
    wherein the first (2, 22, 28) and the second (3, 23, 29) magnetizing structures are identical and arranged so that the active side (8, 45) of the first central magnet (7, 32, 57) of the first magnetizing structure (2, 22, 28) is opposite to the active side (15, 47) of the second central magnet (14, 33, 58) of the second magnetizing structure (3, 23, 29) and the active side (15, 47) of the second central magnet (14, 33, 58) of the first magnetizing structure (2, 22, 28) is opposite to the active side (8, 45) of the first central magnet (7, 32, 57) of the second magnetizing structure (3, 23, 29),
    the magnetic induction vector of the first central magnet (7, 32, 57) is oriented towards its active side (8, 45) and the magnetic induction vectors in the magnetic belt (13, 20), surrounding the first central magnet (7, 32, 57), are directed towards its internal sides (11),
    the magnetic induction vector of the second central magnet (14, 33, 58) is oriented towards its passive side (16, 48) and the magnetic induction vectors in the magnetic belt (20), surrounding the second central magnet (14, 33, 58), are directed towards its external sides (19), and
    the magnetic flux generated by the magnetic field generator (1, 21, 27, 55, 54) forms one single loop and circulates, in the first magnetizing structure (2, 22, 28), from the second (5, 25, 31) to the first (4, 24, 30) magnetizing assembly, in the second magnetizing structure (3, 23, 29), from the second (5, 25, 31) to the first (4, 24, 30) magnetizing assembly and, between the two magnetizing structures (2, 22, 28; 3, 23, 29), through the air gaps (42, 43, 49, 50, 51, 52), from the active side (8, 45) of the first central magnet (7, 32, 57) of the first magnetizing structure (2, 22, 28) to the active side (15, 47) of the second central magnet (14, 33, 58) of the second magnetizing structure (3, 23, 29) and from the active side (8, 45) of the first central magnet (7, 32, 57) of the second magnetizing structure (3, 23, 29) to the active side (15, 47) of the second central magnet (14, 33, 58) of the first magnetizing structure (2, 22, 28).

2. The generator according to claim 1, wherein a magnetic concentration piece (26), made out of a ferromagnetic material, covers the active side (8) of each central magnet (7, 14) and is surrounded by the magnetic belt (13, 20).

3. The generator according to claim 1, wherein each central magnet (57, 58) comprises a magnetic concentration piece (59), made out of a ferromagnetic material, and arranged between a pair of permanent magnets (60), and each central magnet (57, 58) is surrounded by the magnetic belt (13, 20).

4. The generator according to claim 1, wherein the first (32) and the second (33) permanent magnets comprise several permanent magnets (34).

5. The generator according to claim 1, wherein the first (22) and the second (23) magnetizing structures are each mounted in a frame (35) that forms a support made out of a ferromagnetic material.

6. The generator according to claim 1, wherein the first (2) and the second (3) magnetizing structures are each mounted in a frame (36) that forms a support made out of a non-magnetic material.

7. The generator according to claim 1, wherein the generator comprises a third magnetizing structure (37) comprising two polygonal, uniformly magnetized central magnets (38, 39) respectively arranged between the first (7) and the second (14) central magnets of the first (2, 22) and the second (3, 23) magnetizing structures, the central magnets (38, 39) of the third magnetizing structure (37) comprising a first active side (40) and a second active side (41) parallel to one another and to the active sides (8, 15) of the first (7) and the second (14) central magnets, a magnetic induction vector of each of the central magnets (38, 39), of the third magnetizing structure (37), has a same orientation and a same direction as the induction vectors of the first (7) and the second (14) central magnets between which they are arranged, and they form four air gaps (49, 50, 51, 52) superimposed two by two and diametrically opposite two by two.

8. The generator according to claim 1, wherein the magnetic belts (13, 20) comprise several polygonal permanent magnets.

* * * * *